July 16, 1946.  J. O. HAMREN  2,404,229
VARIABLE SPEED TRANSMISSION
Filed Jan. 30, 1941  5 Sheets-Sheet 1
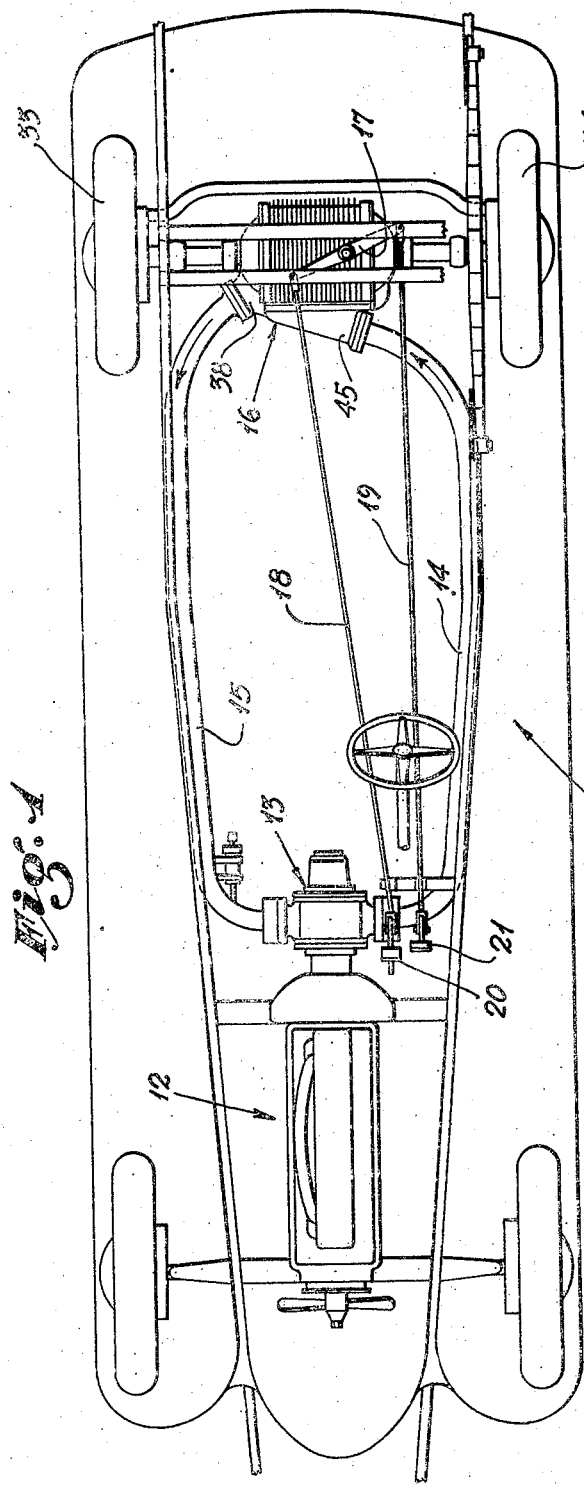
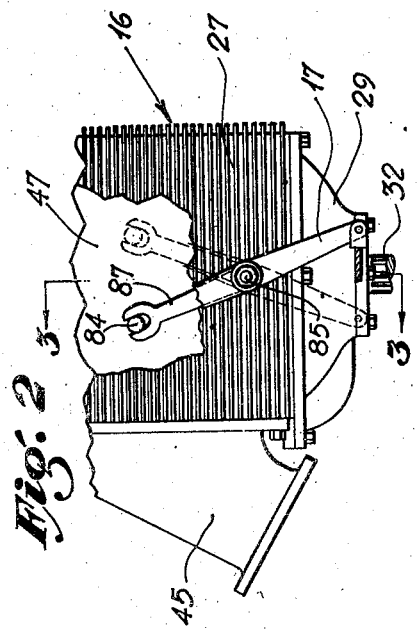
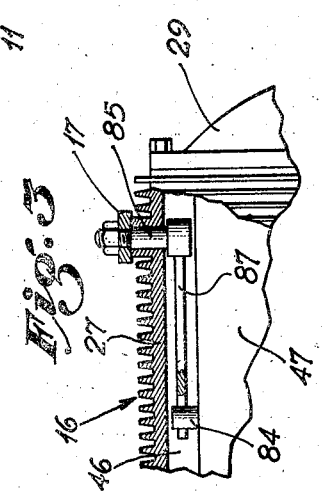
INVENTOR
Joseph O. Hamren.

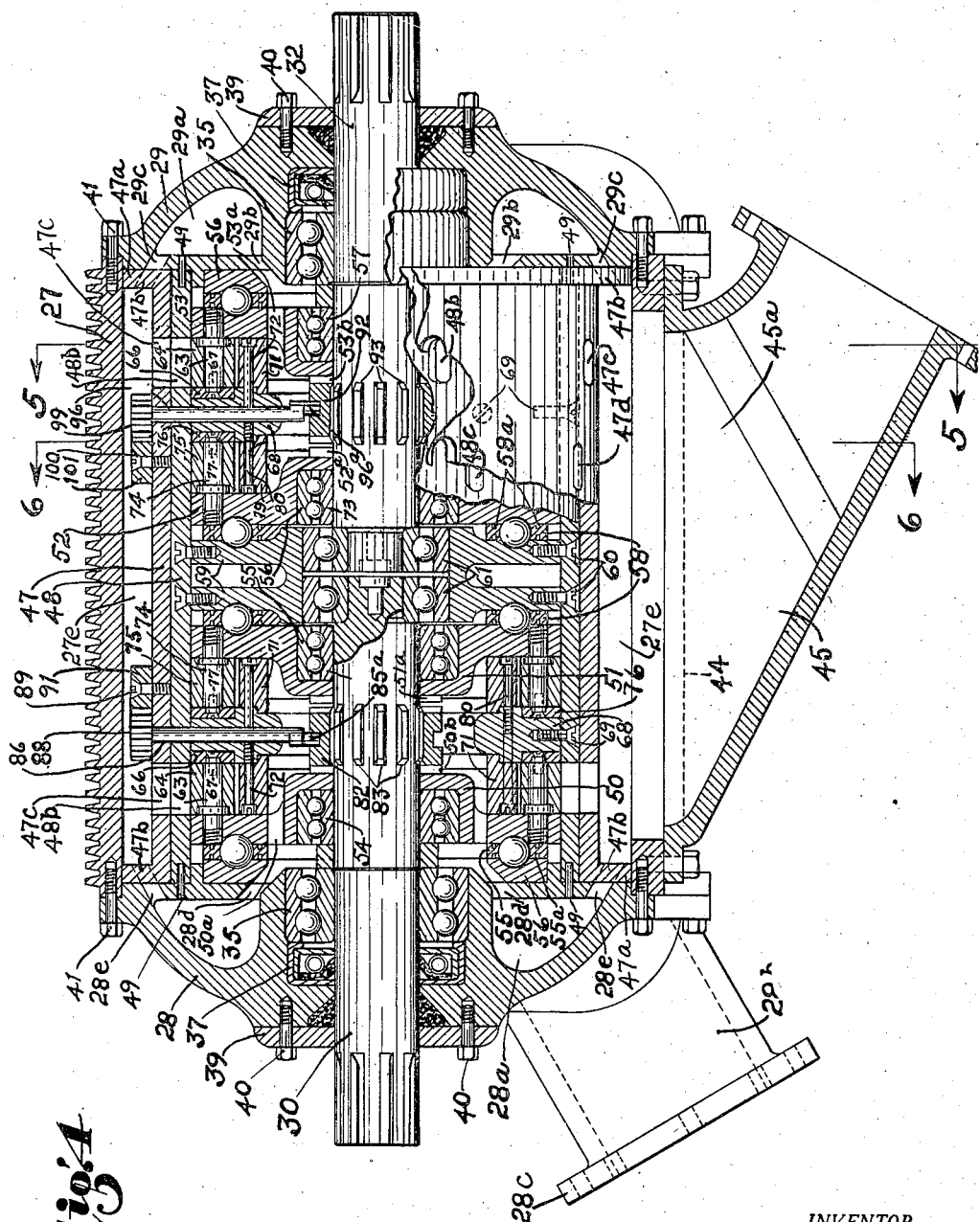

July 16, 1946.   J. O. HAMREN   2,404,229
VARIABLE SPEED TRANSMISSION
Filed Jan. 30, 1941   5 Sheets-Sheet 3

INVENTOR:
JOSEPH O. HAMREN,
BY
ATTORNEY.

July 16, 1946.   J. O. HAMREN   2,404,229
VARIABLE SPEED TRANSMISSION
Filed Jan. 30, 1941   5 Sheets-Sheet 4

INVENTOR:
JOSEPH O. HAMREN,
BY
ATTORNEY.

Patented July 16, 1946

2,404,229

UNITED STATES PATENT OFFICE 2,404,229

VARIABLE-SPEED TRANSMISSION

Joseph O. Hamren, Minneapolis, Minn.

Application January 30, 1941, Serial No. 376,626

16 Claims. (Cl. 60—53)

This invention relates to a power transmitting means and particularly to a variable speed transmitter of the fluid type adapted for use in driving an automotive vehicle.

The particular type of fluid transmitter is similar to that in applicant's Patent Number 1,966,892, granted July 17, 1934, for "Turbine," to which patent reference will be made. The present invention embodies improvements upon the device disclosed in said patent.

It is an object of this invention to provide a simple and efficient variable speed fluid transmission device which may be easily installed in automotive vehicles. The power transmission device per se is of course, capable of varied other uses.

It is a further object of the invention to provide a variable speed fluid transmission unit which is capable of transmitting power with gradual variations in speed.

Another object of the invention is to provide a simple and efficient power transmitting unit which may be easily installed in an automotive vehicle and which is adapted to be connected to and drive the rear wheels of said vehicle.

It is also an object of the invention to provide a variable speed fluid transmission unit which may be used in an automotive vehicle and form a dual drive for the wheels thereof a clutch not being used.

It is also an object of the invention to provide a structure comprising a fluid transmission device having units arranged to be driven in opposite directions and to be connected with the wheels of the automobile.

It is further an object of the invention to provide an automotive vehicle with a fluid transmission device comprising a pair of shafts, a pair of rotors for each shaft, the rotors of said pairs being arranged to be driven in opposite directions to provide forward and rearward drives, said shafts being adapted to be connected to the wheels of the vehicle.

It is still another object of the invention to provide an automotive vehicle with a fluid transmission device comprising a pair of shafts arranged to be connected to the wheels of the vehicle, a pair of rotors for each shaft and sleeves enclosing said rotors adapted to be relatively moved to supply fluid to the desired rotors for forward or rearward driving.

It is a further object of the invention to provide an automotive vehicle with a fluid transmission device comprising shafts adapted to be connected to the wheels of said vehicle, a pair of rotors for each shaft, the rotors of each pair being arranged to be driven in opposite directions for producing forward and rearward speeds together with means for connecting the desired rotors to said shafts.

These and other objects and advantages of the invention will be fully set forth in the following description made in connection with the accompanying drawings in which like reference characters refer to similar parts throughout the several views and in which:

Fig. 1 is a top plan view diagrammatically showing the frame, wheels and part of the body of an automobile with the invention applied thereto;

Fig. 2 is a partial view similar to Fig. 1 shown on an enlarged scale, some parts being broken away;

Fig. 3 is a fragmentary section taken on line 3—3 of Fig. 2;

Fig. 4 is a vertical section taken substantially on line 4—4 of Fig. 5 as indicated by the arrows; some parts being shown in side elevation;

Figure 5:
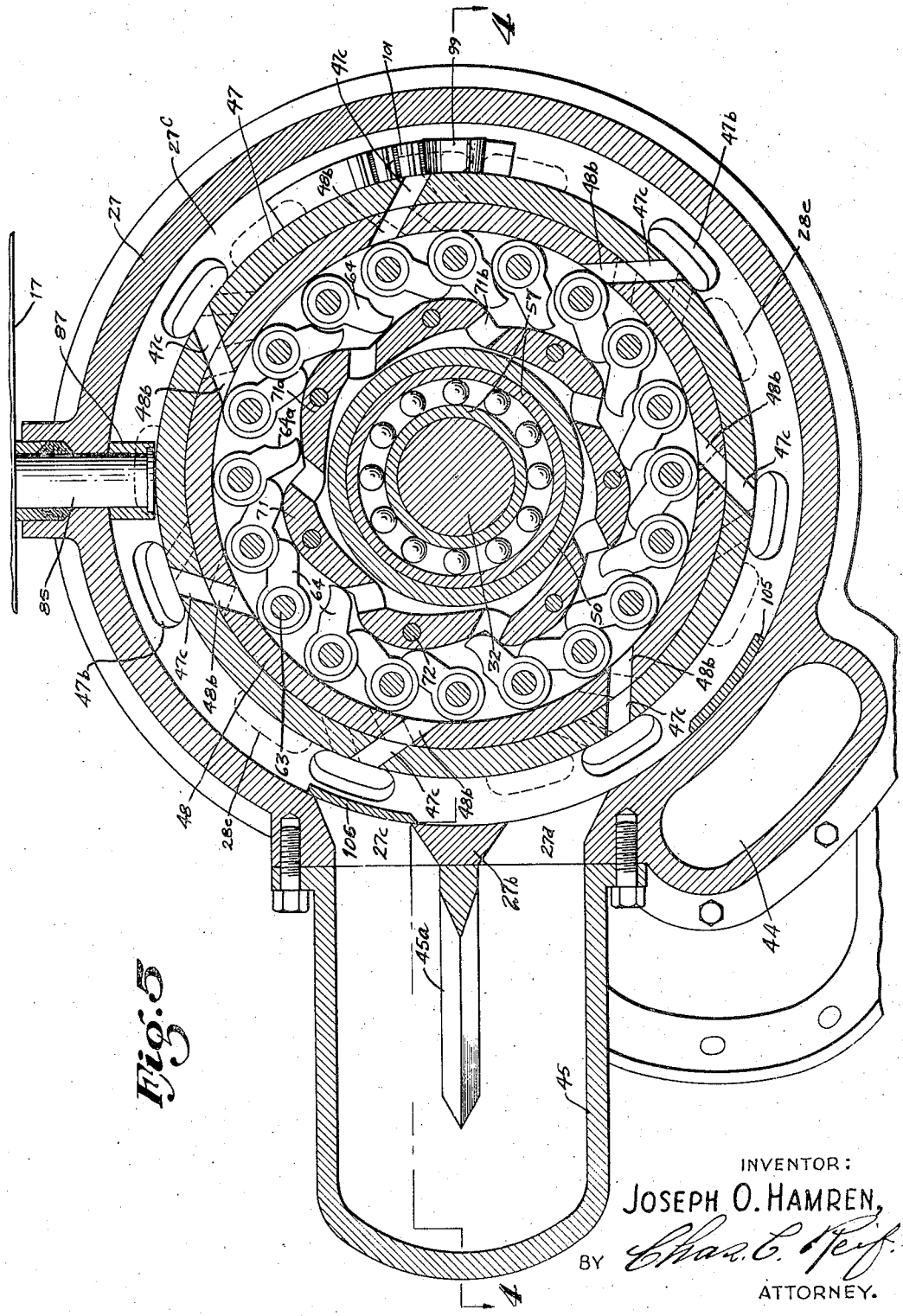
Fig. 5 is a vertical section taken substantially on line 5—5 of Fig. 4 as indicated by the arrows.

Referring to the drawings, particularly Fig. 1, the outline of an automotive vehicle is shown wherein the chassis in general is designated 11. Said vehicle is equipped with the conventional engine 12 such as one of the internal combustion type. Connected to and driven by the engine in any suitable manner is a pump 13. While various types of pumps might be used, preferably one capable of positively circulating a liquid through the system and of building up a pressure therein is used. A discharge pipe 14 and inlet pipe 15 are connected to pump 13 and these pipes are connected at their other ends to my variable fluid power transmitting unit mounted on the rear axle of the vehicle 11 and designated generally 16. Various means for mounting unit 16 on the vehicle or as part of the rear axle structure may be used as long as it be so mounted that unit 16 can be connected in any suitable manner to the rear wheels 33 and 34 of said vehicle.

Means is also provided for controlling the device to effect variable speeds in transmitting power to said rear wheels. While this means could take various forms, in the embodiment of the invention illustrated, the same comprises a crossbar 17 mounted on the unit 16, said crossbar in turn being connected at opposite ends to rods or cables 18 and 19 respectively which are connected to and controlled by foot pedals 20 and 21 respectively. The mechanism operated by the crossbar 17 will be later described in connection with the means for controlling the speeds of my device.

In Figs. 4 to 7 the unit 16 is illustrated more in detail. The mechanism shown in said figures is a refinement of an improvement upon that shown in the patent above identified. Said unit comprises a casing having end portions 28 and 29 and a peripheral portion 27. End members 28 and 29 have disposed therein ball bearings 35 and a sealing member 37 is provided at the outer side of each of said bearings. Shafts 30 and 32 are journaled in bearings 35 respectively having splined portions projecting to the outer side of the end members 28 and 29, which portions will be connected in any desired way with the wheels 33 and 34. End plates 39 are secured to the ends of end members 28 and 29 by bolts 40, said shafts extending through said end plates. End member 28 has an annular chamber 28a therein which communicates with an outlet conduit 28b forming part of end member 28, the same having a flange 28c at its end to which a similar flange on conduit 15 is connected by suitable bolts (not shown). End member 28 has inlet openings 28d and 28e for the transmission of fluid as will be later described. End member 29 has an annular chamber 29a and also has inlet passages 29b and 29c therein. Passages 28a and 29a are connected by a passage 44 extending longitudinally of the casing as shown in Figs. 4 and 5. Passage 44 is formed in an enlargement at one side of member 27. End members 28 and 29 are secured to member 27 by the headed screws 41. Member 27 has a projection 27a at one side thereof to which is connected a member 45. Portion 27a has a central part 27b and passages 27c and 27d extend through portion 27a at each side of portion 27b into the chamber 27e immediately within the portion 27. Member 45 constitutes a conduit, the passage therethrough being divided by a central rib 45a. A sleeve 47 is provided which is concentric with member 27 and which is provided with end flanges 47a bearing at their ends against the end members 28 and 29 respectively. Said flanges have passages 47b therethrough which are adapted to register with the inlet openings 29c and 28e respectively in members 28 and 29. Sleeve 47 is mounted for rotation on a second sleeve 48 about which it fits tightly, sleeve 48 being held stationary by dowel pins 49 extending through end members 28 and 29 respectively thereinto. Sleeve 47 is also formed with a series of ports or openings 47c in the wall thereof and the sleeve 48 is formed with a series of openings 48b adapted to register with the series of openings 47c upon proper relative rotation of sleeves 47 and 48. A second series of ports or openings 47d are formed in the sleeve 47 and these are arranged to register with a second series of ports or openings 48c in the inner sleeve 48.

Within the sleeve 48 and between end members 28 and 29 are mounted four rotors or rotating units designated 50, 51, 52 and 53. These units have hubs containing ball bearing assemblies 54, 73, 73 and 57 respectively upon which said rotors are mounted for rotation about shafts 30 and 32. Rotors 50 and 53 are similar in construction and these bear against ball bearings carried in ball bearing cages 55 disposed between said rotors and end plates 56 seated in recesses in end members 28 and 29 respectively. Members 55 have oil grooves 55a therein. Rotors 51 and 52 are similar and these bear at their adjacent sides on ball bearings carried in ball bearing cages 58 disposed between said rotors and a transversely extending supporting member 59 disposed and fitting within sleeve 48 and secured therein by the screws 60 having heads countersunk in sleeves 48. Cages 58 also have oil grooves 58a therein at opposite sides thereof. It will thus be seen that said rotors rotate in ball bearings at their end portions. Supporting member 59 also carries ball bearings 61 in which the inner ends of shafts 30 and 32 are journaled, the adjacent ends of said shafts being reduced in diameter. The rotors 50 and 53 which as stated, are similar have flange-like outer portions in which are threaded the pivot studs 63 upon which are pivotally mounted the vanes 64. It will be noted that studs 63 have collars adjacent the rotor flanges which are seated in recesses in said vanes and rings 66 are preferably secured to studs 63 by the screws 67 having heads countersunk in said rings. Rings 66 are seated in recesses in members 68 which are fitted in the inner sleeve 48 and held stationery therein by screws 69 having their heads countersunk in said sleeve. A cam member 71 is secured within the path of vanes 64 and pivot studs 63, said cam member being secured to member 68 by screws 72 having their heads countersunk in said cam, said cam is thus held in stationary position. As shown in Fig. 5, each vane 64 has a hub journaled on pivot 63 and has a portion extending from said hub with a curved lower side bearing on the periphery of cam member 71. Cam member 71 has a plurality of portions 71a extending eccentrically to shafts 30 and 32 and said cam has ports or openings 71b between said portions respectively. As shown in Fig. 5, said curved portions of vanes 64 ride upon the periphery of cam 71. It will also be seen that vanes 64 have their upper surfaces provided with curved portions 64a having the same as the curvature of the hub portions of said vanes. Rotors 50 and 53 also have passages 50a and 53a extending therethrough just at the outer side of their hub portions. Rotors 50 and 53 are also provided with ratchet or clutch teeth 50b and 53b at their inner sides.

The rotors 51 and 52 are as stated, also similar and have hub portions carrying the ball bearing assemblies 73 so that said rotors revolve on said bearings about shafts 30 and 32. The rotors 51 and 52 have flange-like portions in which are threaded the pivot studs 74 on which are oscillatably mounted the vanes 75. Vanes 75 are similar to vanes 64 on rotors 50 and 53 except that they extend in the direction opposite to those on rotors 50 and 53. It will be seen that adjacent the rotors the studs 74 have collars thereon seated in recesses in vanes 75 and rings 76 are secured to the ends of studs 74 by screws 77. Rings 76 are seated in recesses in supporting member 68. A cam 79 is disposed within the path of vanes 75 being secured to member 68 by the screws 80 having their heads countersunk therein, said cams thus being held in stationary position. Cams 79 are similar to cams 71 having the plurality of eccentric portions 79a and the openings 79b therebetween, the cams 79 however, being arranged reversely to cams 71. Rotors 51 and 52 have ratchet or clutch teeth 51a and 52a at their remote sides.

A clutch member 82 surrounds shaft 30 between rotors 50 and 51, the same being splined to and slidable longitudinally to shaft 30, the splines therein fitting the spaced keys 83 on shaft 30. Member 82 is bored at one side to receive the end of a pin 85a which is carried on a shaft 86 journaled in member 68. Shaft 86 extends through sleeve 48 and through a slot 47e in sleeve 47 and has secured thereto outside of sleeve 47 a segment or mutilated gear 88. A rack 91 having teeth at its central portion with which the teeth on gear 88 mesh, is disposed at one side of gear 88 and secured to the outer side of sleeve 47 by the screws 89 having their heads countersunk therein. It will be seen that rotation of gear 88 and shaft 86 will cause movement of member 82 longitudinally of shaft 30. Member 82 has clutch teeth at each side thereof adapted to be engaged with the clutch teeth 50b and 51a on the rotors 50 and 51. In Fig. 4 member 82 is shown as connected to rotor 50. A member 92 similar in all respects to member 82, is splined to shaft 32 and secured by the keys 93 thereon. Member 92 is moved by a pin 95a carried by a shaft 96 journaled in the other supporting member 68, said shaft extending through sleeve 48 and through a slot 47f in sleeve 47 and having secured to its outer end and at the outer side of sleeve 47 a mutilated gear 99. Gear 99 is similar to gear 88 and adapted to mesh with the teeth on rack 101 secured to the outer side of sleeve 47 by the screws 100, said screws having countersunk heads.

As shown in Figs. 2 and 3 a stud 85 is journaled in one end of member 27 and has a reduced portion extending through bar 17 midway of the latter. Said reduced portion is threaded and has a nut thereon at the outer side of bar 17. Stud 85 has secured thereto within member 27 an arm 87. Arm 87 extends longitudinally of and between members 27 and 47 and has a fork at its end embracing a pin 84 secured to sleeve 47.

Figure 6:
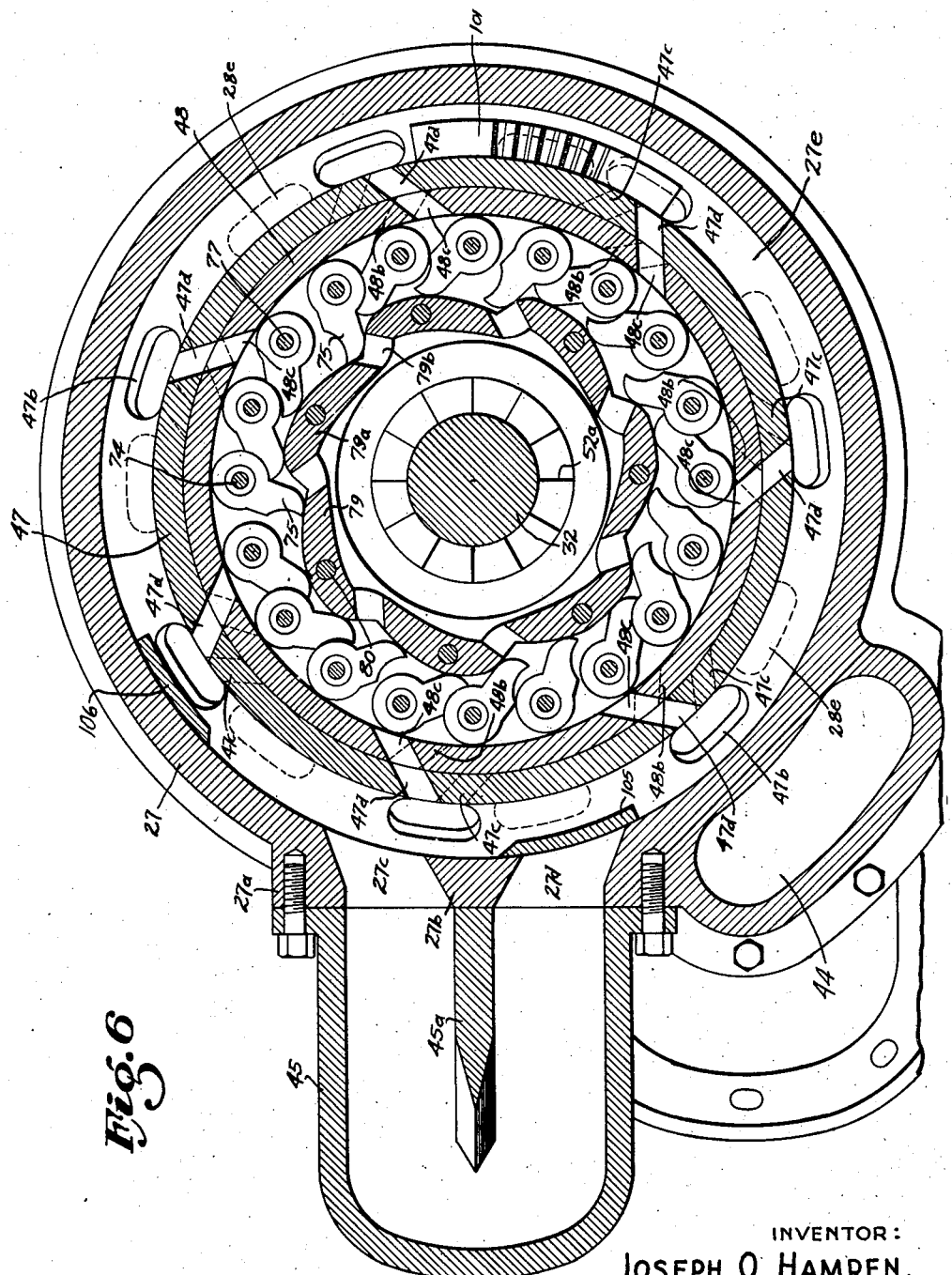
Fig. 6 is a vertical section taken substantially on line 6—6 of Fig. 4 as indicated by the arrows.
Figure 7:
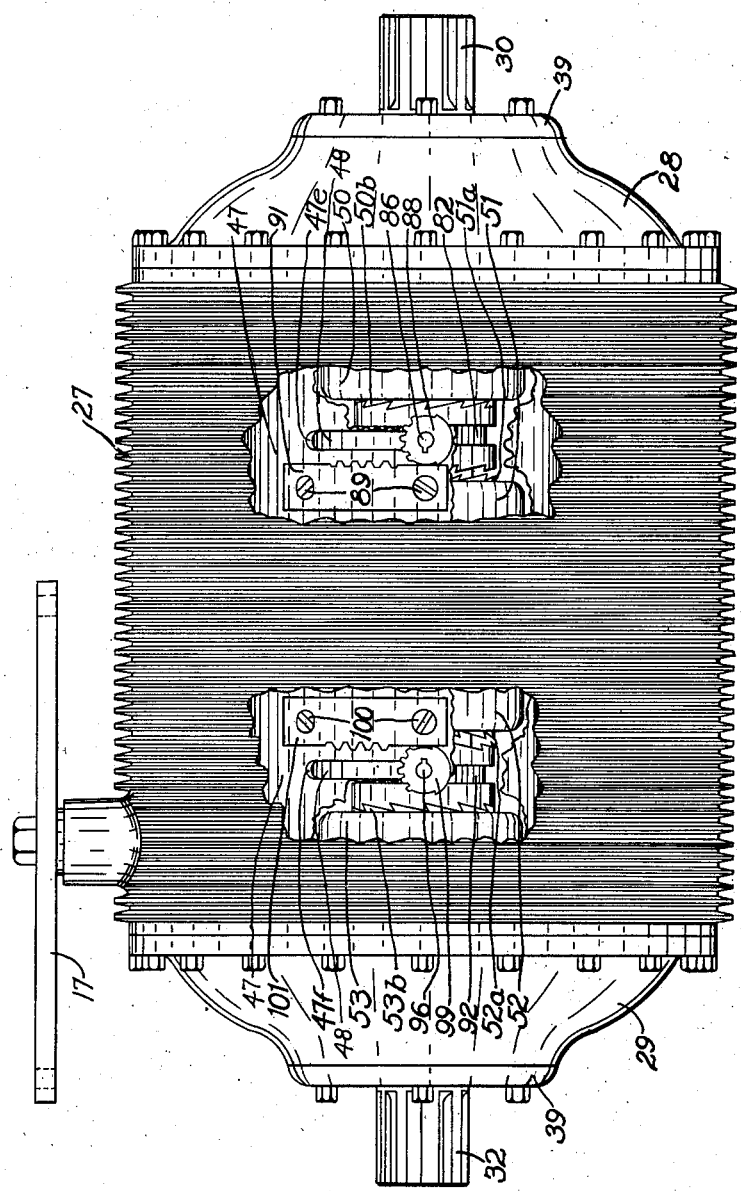
Fig. 7 is a top plan view of the transmission unit, some parts being broken away and others shown in horizontal section.

In conjunction with passages 27c and 27d a plate 105 is secured to sleeve 47 and when passages 47d and 48c are in register sleeve 105 closes passage 27d as shown in Fig. 6. Another plate 106 is also carried by sleeve 47 and when passages 47c and 48b are in register, said plate 106 closes passage 27c.

In operation, the motor 12 of the automotive vehicle will be operated as usual and pump 13 will be operated to circulate a liquid such as oil in the system including member 16, conduits 14 and 15 and said pump. With the parts in the position shown in Figs. 1, 4 and 5 the fluid from conduit 14 will enter member 45 and pass through passage 27d into the chamber 27e between member 27 and sleeve 47. The liquid then passes through openings 47c and 48b which are in register. Referring to Fig. 5, the liquid then engages the upper sides of the vanes 64. The openings 47c and 48b are directed against the vanes and are in effect nozzle inlets to the rotors. The liquid acts on the vanes 64 causing rotation of rotors 50 and 53 and as this rotation occurs the vanes ride down the inwardly extending surfaces of portions 71a on cam 71. When the vanes reach the openings 71b the liquid is released and discharged through said openings and will pass through openings 50a and 53a and then through openings 28d and 29b into chambers 28a and 29a and the liquid from chamber 29a will pass through passage 44 into passage 28b and the liquid from chamber 28a will also pass out through passage 28b and into conduit 15 and back to pump 13. It will be noted that as the vanes ride down the surfaces of cam portions 71a a greater surface is continuously exposed to the liquid so that there is increasing pressure and force of rotation on the rotor. It may be stated that the rings 66 and 68 act as sealing means for the liquid and also as reinforcing supports for studs 63. The rotors 50 and 53 are thus driven and since they are connected by the members 82 and 92 to the shafts 30 and 32 respectively, these shafts are driven and power is transmitted to the rear wheels 33 and 34 of the vehicle. The vehicle is thus driven in a forward direction. It will be understood that by manipulation of pedals 20 and 21 the operator can bring the passages 47c and 48b as well as passages 47b and 28e, 29c more or less into register and the speed of rotation of the rotors and thus the power delivered to the wheels of the vehicle, may be determined at the will of the operator. It will be understood that when openings 47c and 48b are partly in register some of the fluid from chamber 27e bypasses through openings 47b and 28e and 29c. Any speed from zero to maximum speed can be easily and quickly produced.

When it is desired to have rearward motion on the vehicle the operator will manipulate pedals 20 and 21 to move bar 17 and thus move pin 84 and sleeve 47. Sleeve 47 can be moved to bring passages 47d and 48c into alignment as shown in Fig. 6. When this is done the liquid will enter member 45 and pass through passage 27c, passage 27d now being closed by plate 105, and pass into the chamber 27e between member 27 and sleeve 47. The liquid then passes through passages 47d and 48c into engagement with the blades or vanes 75. These are acted upon by the liquid as previously described in connection with vanes 64. Rotors 51 and 52 are thus rotated. When sleeve 47 was rotated as stated, racks 91 and 101 were moved with the sleeve and these engaged with or meshed with the gears 88 and 99, thus rotating the same with the shafts 86 and 96 thus moving members 82 and 92 so that said members moved into engagement and became clutched to the rotors 51 and 52. Rotors 50 and 53 were at the same time disconnected so that shafts 30 and 32 will be driven in the reverse direction and the vehicle will be moved rearwardly. The speed of the rearward movement can be regulated and determined by the operator by manipulation of pedals 20 and 21. The device can be placed in neutral position by having bar 17 midway of the two positions indicated in Fig. 2. At that time neither of the two series of openings 47c and 48b or 47d and 48c will be in register. However, openings 47b will be brought into register respectively with openings 28e and 29c. The liquid circulated will then pass through the later openings or passages into the chambers 28a and 29a and thence into conduit 28b and back to the pump. The liquid is thus merely bypassed when the device is in neutral position.

From the above description it will be seen that I have provided a simple, compact and highly efficient structure for producing various forward and rearward speeds on the vehicle. In practice pump 13 will produce a pressure sufficient to carry the load regardless of the amount of register of the openings 47c and 48b or 47d and 48c. There will always be therefore, sufficient power for the vehicle. It will also be seen that whether the two rotors 50 and 53 are operating together or the two rotors 51 and 52 are operating together, that there will be a film of oil on the cams 71 and 79 so there will be very little friction between the vanes and said cams. The parts are designed for easy manufacture and ease of assembly. It will be apparent that the device will have a high degree of utility for the purpose intended.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A transmission unit having in combination, a casing, two pairs of rotors in said casing each comprising a plurality of circumferentially spaced oscillating vanes, a pair of shafts journaled in said casing concentric with said rotors, a second casing within said casing and concentric with said rotors, means for supplying fluid under pressure to said second casing at circumferentially spaced points to drive one rotor of each pair in one direction, means for supplying fluid to said second casing at circumferentially spaced points to drive the other rotor of each pair in the opposite direction and means in said casing for connecting one of said rotors of each pair to one of said shafts and for connecting the other rotor of each pair to the other of said shafts.

2. A transmission unit having in combination, a casing, an inner casing within and spaced from said casing, means for delivering fluid under pressure between said casings, a pair of rotors within said inner casing having means thereon adapted to be engaged by said fluid for driving said rotors, a sleeve rotatable on said inner casing, said sleeve and inner casing having a series of openings therethrough adapted to be brought into register for admitting fluid under pressure to one of said rotors to drive the same in one direction, said inner casing and sleeve having a second series of openings therethrough adapted to be brought into register for admitting fluid under pressure to the other of said rotors for driving it in a direction opposite to said first mentioned rotor.

3. A transmission unit having in combination, a casing, an inner casing spaced from said casing forming a chamber, means for delivering fluid under pressure to said chamber, a sleeve mounted on said inner casing for rotation thereon, a pair of rotors in said inner casing each having a series of vanes oscillatably mounted thereon, cams on which said vanes move in the rotation of said rotors, openings in said inner casing and sleeve adapted to be brought into register for admitting fluid to one of said rotors, a second set of openings in said inner casing and sleeve adapted to be brought into register for admitting fluid into the other of said rotors, said rotors being driven in opposite directions, said fluid acting on said vanes and passing out through said cams and a shaft to which said rotors may be selectively connected.

4. An hydraulic variable speed transmission comprising a casing, an inner casing fixedly mounted within said casing, a sleeve rotatably mounted on said inner casing forming an annular chamber between the same and said casing, said inner casing having a series of inlet ports therein and said sleeve also having a series of ports adapted to connect said inlet ports with said annular chamber upon rotation of said sleeve, a rotor mounted within said inner casing comprising a plurality of vanes oscillatable about axes parallel to the axis of said rotor and adapted to be rotated by a liquid under pressure delivered through said ports, a cam member within and engaged by said vanes, means for supplying liquid under pressure to said annular chamber and means for rotating said sleeve to register said ports to admit fluid to said rotor.

5. An hydraulic variable speed transmission comprising a casing, an inner casing fixedly mounted within said casing, a pair of rotors mounted within said inner casing and having means thereon arranged respectively to be rotated in reverse directions by liquid under pressure, a sleeve rotatably mounted on said inner casing and forming an annular chamber between the same and said casing, means for delivering fluid under pressure to said chamber, said inner casing having two series of inlet ports therein, one of said series being arranged to admit liquid to one of said rotors to rotate it in a forward direction and the other of said series being arranged to admit liquid under pressure to said second rotor to rotate it in a reverse direction and said sleeve having two series of ports therein adapted to connect said series of inlet ports respectively with said annular chamber, means for supplying liquid under pressure to said annular chamber and means for rotating said sleeve to register one series of sleeve ports with one series of inlet ports or alternately to register the other series of sleeve ports with the other series of inlet ports to thus admit liquid selectively to said rotors.

6. An automotive vehicle structure having in combination, a variable speed transmission unit comprising a casing, a pair of fluid driven rotors in said casing, a shaft journaled at its ends in said casing about which said rotors rotate, means for supplying fluid under pressure to said rotors to rotate them in opposite directions respectively and means within said casing for directly connecting said rotors alternately to said shaft.

7. A transmission unit comprising a casing, two pairs of rotors in said casing, said rotors each comprising circumferentially spaced oscillatable vanes, means for supplying fluid under pressure to said casing to engage said vanes and rotate rotors of each of said pairs in opposite directions, a pair of coaxially arranged shafts disposed substantially wholly within said casing at the centers of and coaxial with said rotors, and means for selectively and directly connecting one rotor of each pair to said shafts respectively so that said shafts may each be driven in opposite directions one pair of said rotors being idle while the other pair is being driven.

8. A fluid transmission device having in combination, a casing, a pair of rotors in said casing having means thereon adapted to be engaged by fluid for driving said rotors, a second pair of rotors in said casing having means thereon adapted to be engaged by fluid for driving said rotors coaxial with said first mentioned rotors and arranged to rotate in a direction opposite that of said first mentioned rotors, a pair of shafts journaled at their ends in said casing and disposed mainly therein, said shafts being coaxial with said rotors on which one of said rotors of each pair respectively rotate, means within said casing for connecting a rotor of each of said pairs with said respective shafts alternately so that said shafts may both be driven in the same direction or may both be driven in the opposite direction and means for delivering fluid under pressure to said rotors.

9. The structure set forth in claim 8, a casing extending about said first mentioned casing and forming a liquid containing chamber from which said fluid is supplied to said rotors and means for by-passing the liquid through said chamber without operating said rotors.

10. A fluid transmission device having in combination, a casing, a pair of rotors in said casing having means thereon adapted to be engaged by fluid for driving said rotors, means for admitting fluid under pressure to said casing to drive one of said rotors in one direction without driving the other rotor or for driving said other rotor in the opposite direction and not driving said first mentioned rotor, a shaft journaled at its ends in said casing at the center of and coaxial with said rotors and on which said rotors revolve and means for connecting either of said rotors to said shaft.

11. A fluid transmission device having in combination, a casing, a pair of rotors in said casing adapted to be rotated by liquid under pressure, a second casing surrounding said casing and forming a chamber thereabout for containing liquid under pressure, means for admitting liquid from said chamber into said first mentioned casing for rotating said rotors in one direction, a second pair of rotors in said first mentioned casing, means for admitting liquid from said chamber to said first mentioned casing for rotating said second pair of rotors in the opposite direction, a pair of shafts in said casing coaxial with said rotors, one of the rotors of each of said pairs rotating about one of said shafts and the other rotor of each pair rotating about the other shaft and means for connecting one of the rotors in each of said pairs to its respective shaft.

12. A fluid transmission device having in combination, a casing, a second casing extending about said casing and forming a chamber for containing liquid under pressure, means for delivering fluid under pressure to said chamber, a rotor in said first mentioned casing having means thereon adapted to be rotated in one direction by fluid to drive said rotor in said direction, a second rotor in said first mentioned casing having means thereon arranged to be rotated in an opposite direction by fluid to drive said second rotor in said opposite direction, a shaft in said casing coaxial with said rotors and about which said rotors revolve, means for selectively and controllably admitting liquid under pressure from said chamber to said first mentioned casing to rotate either of said rotors, the other rotor being idle and means within said first mentioned casing for connecting either of said rotors to said shaft.

13. A fluid transmission device having in combination, a casing, two pairs of rotors in said casing, one pair of said rotors having means thereon constructed and arranged to be rotated by fluid in one direction and the other pair having means thereon constructed and arranged to be rotated by fluid in the opposite direction, a pair of shafts journaled at their end portions in said casing coaxial with said rotors, one of the rotors of each pair being rotatable on one of said shafts and the other rotors of each pair being rotatable on the other shaft, means within said casing for connecting one of the rotors of each pair to said shafts respectively and means for supplying liquid under pressure to said rotors to rotate either pair of said rotors, the other pair being idle.

14. A fluid transmission device having in combination, a casing, a pair of fluid-driven rotors in said casing each rotor comprising a plurality of circumferentially spaces oscillatable vanes, said casing having a plurality of circumferentially spaced ports spaced thereabout for directing liquid to said rotors, a shaft supported adjacent its ends in said casing about which said rotors rotate, means for supplying fluid under pressure to said rotors through said ports to rotate either of said rotors, the other rotor being idle, said means operating to supply said fluid to rotate said rotors in opposite directions respectively and means for connecting either of said rotors to said shaft.

15. A fluid transmission device having in combination, a casing, a pair of fluid-driven rotors in said casing, means for delivering fluid under pressure to said rotors said casing having a plurality of circumferentially spaced ports thereabout for admitting fluid to said rotors, a sleeve fitting about and oscillatable about said casing, said sleeve having a plurality of circumferentially spaced ports therethrough adapted to be brought into and out of register with said ports in said casing, certain of said ports and one of said rotors being arranged so that said rotor is driven in one direction with the other rotor idle and certain of said ports and the other rotor being constructed and arranged so that said other rotor is driven in the opposite direction with said one rotor idle, a shaft in said casing about which said rotors rotate, and means for connecting either of said rotors to said shaft.

16. A transmission unit having in combination, a casing, a pair of coaxial rotors therein spaced longitudinally along their common axis, each comprising a plurality of circumferentially spaced oscillating vanes, means for selectively supplying fluid to said casing and rotors alternately at circumferentially spaced points about said casing to drive said rotors in opposite directions, a shaft journalled adjacent its ends in said casing on which said rotors revolve and means for connecting either of said rotors to said shaft.

JOSEPH O. HAMREN.